(12) United States Patent
Delespaul

(10) Patent No.: US 8,722,118 B2
(45) Date of Patent: May 13, 2014

(54) METHOD FOR FLAVORING CHEESE PRODUCTS

(75) Inventor: Gilbert Delespaul, Vendome (FR)

(73) Assignee: Fromageries Bel, Paris (FR)

( * ) Notice: Subject to any disclaimer, the term of this patent is extended or adjusted under 35 U.S.C. 154(b) by 620 days.

(21) Appl. No.: 12/298,479

(22) PCT Filed: Apr. 24, 2007

(86) PCT No.: PCT/FR2007/000692
§ 371 (c)(1),
(2), (4) Date: Feb. 9, 2009

(87) PCT Pub. No.: WO2007/125192
PCT Pub. Date: Sep. 8, 2007

(65) Prior Publication Data
US 2009/0186123 A1 Jul. 23, 2009

(30) Foreign Application Priority Data

Apr. 25, 2006 (FR) ...................................... 06 03681

(51) Int. Cl.
*A23C 19/082* (2006.01)
*A23C 19/06* (2006.01)

(52) U.S. Cl.
USPC .............................................. 426/36; 426/42

(58) Field of Classification Search
CPC ...... A23C 19/14; A23C 19/06; A23C 19/061; A23C 19/062; A23C 19/08; A23C 19/084; A23C 19/082; C12N 1/06; C12N 1/20; C12N 1/38; C12R 1/225; C12R 1/15
USPC .......................................................... 426/36
See application file for complete search history.

(56) References Cited

U.S. PATENT DOCUMENTS

| 6,586,025 | B2 * | 7/2003 | Yvon et al. | 426/39 |
| 2003/0129275 | A1 * | 7/2003 | Andersen | 426/36 |
| 2005/0112238 | A1 * | 5/2005 | Dias et al. | 426/36 |
| 2007/0274955 | A1 * | 11/2007 | Gibson et al. | 424/93.4 |

FOREIGN PATENT DOCUMENTS

| AU | 766053 | * | 5/1999 |
| EP | 535728 | A2 * | 4/1993 |
| EP | 0 948 897 | | 10/1999 |
| FR | 2 762 479 | | 10/1998 |
| FR | 2778821 | | 10/2008 |
| JP | 946 681 | | 8/1956 |
| JP | 61158746 | | 7/1986 |
| WO | 98/48645 | | 11/1998 |
| WO | 02/096209 | | 12/2002 |

OTHER PUBLICATIONS

Pavlova, S. I., Miteva, V. I., Mihailova, L. I., Radoevska, S. A., Stefanova, T. T., "Effect of medium composition on the ultrastructure of *Lactobacillus* strains," Archives of Microbiology, (1993) 160: 132-136.*
International Search Report dated Aug. 20, 2007, in French Application.

* cited by examiner

*Primary Examiner* — Humera Sheikh
*Assistant Examiner* — Jeffrey Mornhinweg
(74) *Attorney, Agent, or Firm* — Young & Thompson

(57) ABSTRACT

The present invention relates to a method for flavoring a cheese product by processing at least one initial cheese base, including a stage for the heat and mechanical kneading type treatment of the initial cheese base, after it has been split up, at a temperature $T_1$ of at most 80° C., in order to secure a limited destructuring of the protein network of the initial cheese base, characterized in that at least one flavoring agent, selected from the group constituted by flavor fermenting agents that present an increased enzymatic activity and embrittlement of their cellular wall, flavor fermenting lysates, and amino group accepting compounds, is added to the initial cheese base and/or during the stage above.

15 Claims, No Drawings

METHOD FOR FLAVORING CHEESE PRODUCTS

The present invention relates to a method for flavouring cheese products and the cheese products obtained using this method.

The conventional method of making cheeses from milk involves in particular the following steps (see, for example, Le Fromage, (Cheese) Eck A. and Gillis J. C., 1997, 3$^{rd}$ edition, Lavoisier TEC & DOC, Paris):
- coagulation by means of physico-chemical modification of micelles of milk casein in order to provide a three-dimensional protein network, the coagulum;
- slicing the coagulum and eliminating lactosérum in order to provide the curd;
- grinding the curd, optionally pressing the curd in moulds;
- acidification, optionally salting or brining the curd, and ripening the curd.

It is during this final ripening step that the cheese acquires most of its characteristic properties of texture and flavour.

The flavour components obtained during the ripening originate, in particular, from degradation of the lipid and protein constituents of the curd and a transformation of the digestion products under the action of exo- or intra-cellular microbial enzymes.

In this manner, the degradation of the lipids is carried out under the action of lipases and that of the proteins under the action of proteases of the endopeptidase type. The peptides released by the endopeptidases may be further broken down by exopeptidases which release amino acids. These amino acids form the basis of a large number of flavour compounds, such as volatile acids, alcohols, aldehydes, sulphur-containing compounds, compounds having an aromatic core and pyrazines. One of the main starting points for the modification of the amino acids is catalysis by the transaminases (or aminotransferases). These enzymes catalyse the transfer of the α-amine group of amino acids to an amine group accepting compound, such as α-ketoglutarate (α-KG) in order to provide α-keto acids. The α-keto acids obtained spontaneously decarboxylate in order to provide aldehydes which may themselves be converted into acids or into alcohols. The content in terms of accepting keto acids may be a limiting factor in the development of flavour compounds.

In this regard, the French patent application No. 2 762 479 describes the use of a cheese preparation additive which comprises at least one keto acid in order to intensify the flavour of a cheese originating from a conventional method. The French patent application No. 2 777 905 itself relates to strains of lactic bacteria which are genetically modified in order to produce excessive amounts of α-ketoglutarate.

The ripening step is a costly process since it is often long and requires investments in terms of equipment and premises; furthermore, controlling the ripening methods has been found to be difficult in terms of ensuring the uniformity of organoleptic characteristics of the finished cheeses. By way of example, for cheeses with no superficial ripening flora, such as GOUDA, the development of the flavours may require, depending on the organoleptic characteristics desired, long periods of ripening of from 3 to 6 months.

Furthermore, the European Patent EP 1 079 697 describes a method, referred to as "retexturing", for transforming an initial cheese base, which allows cheeses to be obtained which have the flavour characteristics of the initial cheese and which have a flexible and resilient texture which even melts in the mouth. This method in particular involves a first step for limited destructuring of the protein network of a cheese base, under the action of moderate mechanical and thermal processing, followed by a cooling step during which there is a restructuring of the protein network and the formation of a stable emulsion of the fatty materials with the other constituents of the cheese base. This retexturing method is generally used for cheeses which have been matured for at least two weeks. However, it may be advantageous, in this method, to use younger, unripened cheese bases as described in the application WO 02/096209; however, the product obtained in this instance has a neutral taste and a bland flavour since the cheese base has not had the time to develop the flavour compounds. If it is desirable to confer flavour characteristics of a ripened cheese on the products originating from this transformation method, it is necessary to use products which are already ripened as a cheese base. This solution is costly since it does not allow the cheese ripening step to be dispensed with.

It may be advantageous, from an economic point of view, to produce cheeses which have organoleptic properties of ripened cheeses directly from neutral cheese bases, such as those used in the method described in the application WO 02/096209, or other raw cheese materials obtained using other methods, without involving a prolonged period of ripening.

In this regard, the inventors have surprisingly shown that the incorporation of specific flavouring agents and/or amine group accepting compounds (in particular keto acids) in cheese bases, before or during the retexturing method, did not inhibit the development of these ferments and the specific role of the amine group accepting compounds in the subsequent development of the flavouring compounds.

The inventors have also shown that by directly incorporating in these cheese bases either amine group accepting compounds or specific flavour ferments, or a combination of both, it was possible to obtain products which are close in terms of organoleptic and textural characteristics to the products obtained using the conventional cheese production method, avoiding the losses of the amine group accepting compounds in the lactosérum and allowing better control of the methods in order to obtain products of homogeneous and uniform quality.

In this context, the present invention relates to a method for incorporating amine group accepting compounds and/or specific flavour ferments into cheese bases in order to obtain products which have organoleptic characteristics which are similar to those of ripened products obtained using a conventional cheese production method, in shorter periods of time and at a lower ripening temperature The method for incorporating these flavouring agents uses a retexturing method which involves mixing and kneading one or more cheese bases under temperature and agitation conditions which prevent the complete destructuring of the cheese base(s).

In this manner, the present invention relates to a method for flavouring a cheese product by processing at least one initial cheese base, involving the following steps:

a) a thermal and mechanical processing operation of the type for kneading of the initial cheese base, optionally after fractionation thereof, at a temperature $T_1$ of a maximum of 80° C., in order to obtain a limited destructuring of the protein network of the initial cheese base, b) cooling the mixture of step a) to a temperature $T_2$ which is in the range between $T_1 - 8°$ C. and $T_1 - 20°$ C., advantageously $T_1 - 10°$ C. and $T_1 - 15°$ C. inclusive, in order to obtain a restructuring of the protein network and the production of a stable emulsion;

c) if necessary, mechanically processing the paste obtained at b) in an endless screw device in order to complete the restructuring of the protein network and the stabilisation of the emulsion; and d) optionally shaping the product obtained after step c) or after step b) if step c) is omitted;

characterised in that the step a) and/or b) above is carried out in the presence of at least one flavouring agent which is selected from the group constituted by flavour ferments which have an increased level of enzyme activity and weakness of their cell wall, lysates of flavour ferments and amine group accepting compounds.

The present invention also relates to a method for preparing a flavour ferment which has an increased level of enzyme activity and weakness of its cell wall, wherein the flavour ferment is obtained by means of culture under sub-optimal growth conditions.

The present invention also relates to a flavour ferment which has an increased level of enzyme activity and weakness of its cell wall which is capable of being obtained using the flavour ferment preparation method above.

The present invention also relates to the use of at least one flavour ferment which has an increased level of enzyme activity and weakness of its cell wall as defined above for the production of cheese products.

Flavour Ferments

"Flavour ferment" or "ripening ferment" is intended to refer to any micro organism, in particular of the bacteria or yeast type, which allows the flavours of a cheese product to be developed, that is to say, in particular a micro organism which breaks down the lipid and protein constituents of a curd in order to convert them into flavour molecules. Flavour and ripening ferments are well known to the person skilled in the art and are in particular described in "Le Fromage", Eck A. and Gillis J. C., 1997, $3^{rd}$ edition, Lavoisier TEC & DOC, Paris, pages 377-423.

In the invention, at least one flavour ferment is used which has an enzyme activity, in particular protease and/or peptidase activity and weakness of the cell wall thereof, in particular with respect to the same aroma ferment cultivated under standard conditions, that is to say, in particular in a standard culture medium.

"Standard conditions" and "standard medium" are intended to refer to conditions and a medium, respectively, which provide optimum growth for a flavour ferment. In particular, the standard medium is not deficient, in particular in terms of nitrogen.

For a specific flavour ferment, the standard culture conditions and the standard culture media are well known to the person skilled in the art. Such standard conditions and culture media are characterised in particular by a culture of from 6 to 12 hours in an MRS broth (DeMan, Rogosa and Sharpe) incubated at 40±3° C.

The culture conditions or a culture medium which provide optimum growth of a flavour ferment are such that they provide the flavour ferment with all the resources necessary for its growth. In particular, the culture medium is not deficient, that is to say that none of the components of this medium, in particular none of the nitrogen-containing components of this medium, is present in a limiting quantity, that is to say, a quantity such that the growth of the flavour ferment is found to be affected thereby, in particular slowed down. Determining the composition of a medium which provides optimum growth for a flavour ferment may be carried out in a routine manner by a person skilled in the art. Furthermore, media which provide optimum growth for a flavour ferment are widely commercially available.

The enzyme activity, in particular protease and/or peptidase activity, of a flavour ferment according to the invention may be evaluated using numerous techniques which are well known to the person skilled in the art and can thus be compared to that of a standard flavour ferment. In particular, it is possible to measure the amino-peptidase activity of these ferments. To this end, it is possible to measure the degradation enzyme activity of a model enzymatic substrate, for example, L-leucine-p-nitroanilide, in particular using the protocol set out in Example 3. It is also possible to evaluate the proteolysis, that is to say, the quantity of peptides and amino acids released in a cheese product prepared using at least one flavour ferment according to the invention compared with a reference cheese product, that is to say, a cheese product which is prepared in a similar manner to the cheese product according to the invention but using standard lactic ferments. It is also possible to evaluate the quantity of flavour compounds released in the cheese product according to the invention (for example, branched aldehydes, alcohols, ketones, esters or compounds originating from the catabolism of the sulphur-containing amino acids) compared with a reference cheese product.

A flavour ferment which has weakness of its cell wall may be characterised by the property of being more rapidly lysed, when it is immersed in a solution which is hypertonic with respect to its cytoplasm, than a standard flavour ferment, which has no weakness of its wall. This weakness may also be evaluated by the sensitivity to lysis of a flavour ferment in the presence of surfactants such as osmotic agents or detergents, of enzymes, such as lysozyme or mutanolysin, or bacteriocins, such as nisin or lacticin.

It goes without saying that, during the comparison of the characteristics of a flavour ferment according to the invention with a standard flavour ferment, the measurements are carried out under the same conditions.

The increased level of enzyme activity and the weakness of the cell wall of the flavour ferments according to the invention in particular allows more rapid, more complete and more significant release of the intra-cellular enzymes, in particular of the protease and peptidase type, compared with flavour ferments which have no weakness of their cell wall, which allows the flavour of products obtained using these flavour ferments with weakened walls to be developed in a significant manner.

In a method for preparing a flavour ferment which has an increased level of enzyme activity and weakness of its cell wall according to the invention, the flavour ferment is obtained by means of culture under sub-optimal growth conditions.

"Sub-optimal growth conditions" are defined as being conditions which do not provide optimum growth for the flavour ferment cultivated under these conditions. Sub-optimal growth conditions may in particular be obtained by means of culture in a deficient medium and in particular in a medium which is deficient in terms of nitrogen. The precise sub-optimal growth conditions are generally dependent on each strain and may be readily defined by the person skilled in the art in accordance with the strain(s) in question and the final characteristics desired.

Determining the sub-optimal growth conditions for a specific flavour ferment may be carried out routinely by the person skilled in the art based on standard growth conditions defined for this flavour ferment. In particular, the person skilled in the art may reduce the concentration of one or more constituents of a standard culture medium for this flavour ferment, in particular a nitrogen-containing constituent in order to affect the growth of this flavour ferment in this medium.

Preferably, the culture is carried out until a stationary growth phase is achieved which may then be maintained for a variable period of time. The period of time for which the stationary phase is maintained may be adjusted in accordance with the desired degree of weakness of the cell wall. The evaluation of the growth phase in which a flavour ferment culture is located, in particular the exponential growth phase and the stationary growth phase, may be carried out using techniques which are well known to the person skilled in the art, such as spectrophotometry, monitoring the consumption of oxygen or monitoring the consumption of neutralising agents, such as sodium carbonate.

The flavour ferment cultures originating from the above culture have a viable cell/non-viable cell ratio of approximately 10% which may vary in accordance with the flavour ferment in question. The viable cells are for the most part viable cells which cannot be cultivated and which may be counted using any appropriate technique and in particular using the techniques well known to the person skilled in the art, which are epifluorescence and flow cytometry.

The lysates of flavour ferments may be obtained using means which are well known to the person skilled in the art and which allow partial or complete lysis of cells of micro organisms to be obtained, in particular:
- physical means: high pressures, homogenisation, mechanical grinding, thermal shocks, freezing/thawing processing operations, osmotic pressure,
- chemical means: processing by means of detergent agents, alcohol, salt/alcohol combinations,
- the use of bacteriocins (nisin, pediocins, enterocins . . . ),
- the use of agents which are capable of embrittling the walls (protamine, chitosan, serine . . . )
- the use of enzymes (lysozyme . . . ).

Flavour ferments which are based on lysates or which have an increased level of enzyme activity and weakness of the cell wall and which are used in the method of the invention originate in particular from lactic bacteria such as thermophilic strains of *Lactobacilli* which are homofermentary (*Lactobacillus helveticus, Lactobacillus acidophilus, Lactobacillus bulgaricus*) or heterofermentary (*Lactobacillus fermentum, Lactobacillus reuteri*), optional homofermentary or heterofermentary mesophilic strains of *Lactobacilli* (*Lactobacillus casei, Lactobacillus paracasei, Lactobacillus plantarum*), strains of *Lactococci* (*Lactococcus lactis* subsp. *lactis, Lactococcus lactis* subsp. *cremoris, lactococcus lactis* subsp. *lactis biovar* diacetylactis), strains of *Pediococci* (*Pediococcus acidilactici*), strains of *corynebacteria*, strains of propionic bacteria (*Propionibacterium freudenreichii, P. shermanii*), strains of yeasts and *Geotrichum candidum*.

Preferably, the flavour ferment is obtained from the strain *Lactobacillus helveticus* BS121. This ferment is the result of selection work carried out on a model medium based on an extensive collection of strains of thermophilic *Lactobacilli*, and in particular *Lactobacillus helveticus*, in order to develop different flavour ferments which lead to specific flavour notes. This strain was registered in accordance with the Treaty of Budapest, 12 Jan. 2006, with the National Collection of Micro Organism Culture (CNCM, Paris, France) under the number 1-3552.

In the method of the invention, the levels of injection with flavour ferment are from $10^5$ to $10^8$ cells of ferment/g of cheese base, in particular from $10^6$ to $10^7$ cells of ferment/g and the lysates injected with flavour ferments are prepared based on from $10^5$ to $10^8$ cells of ferment/g of cheese base, in particular from $10^6$ to $10^7$ cells of ferment/g.

The flavour ferments may be in the form of concentrated or non-concentrated culture.

Amine Group Accepting Compounds

The term "amine group accepting compounds" is intended to refer to any organic compound which is capable of bonding, in particular in a covalent manner, to an —$NH_2$ group during transamination reactions. During these reactions, which are in particular catalysed by transaminases, an —$NH_2$ group is transferred from an amino flavour precursor compound to an amine group accepting compound. The term "amino flavour precursors" is intended to refer to any organic amino compound which is capable of providing a flavour compound. By way of example, amino acids are amino flavour precursors.

In particular, amine group accepting compounds are keto acids, and more specifically an $\alpha$-keto acid such as $\alpha$-ketoglutarate, $\alpha$-ketoisocaproate, ketoisovalerate, a pyruvate, such as phenylpyruvate, or $\alpha$-acetolactate. A particularly preferred amine group accepting compound according to the invention is $\alpha$-ketoglutarate.

These compounds promote and accelerate in particular the degradation of the amino acids into flavour molecules (such as branched and aromatic aldehydes in particular) and are widely commercially available or can be produced in accordance with the method described in the French patent application No. 2 777 905.

Preferably, the amine group accepting compound is added in the method of the invention at a content of from 1 to 20 g/kg of cheese base, in particular at a content of 10 g/kg.

Cheese Base

The term "cheese base" is intended to refer to a raw cheese material which is capable of being used in the method of the invention in order to provide a cheese product, that is to say, a raw material which "can be retextured", that is to say, in particular:

1) a cheese which may or may not be ripened, obtained using a conventional method, and in particular with a dry extract greater than 40% by weight, such as a pressed paste cheese, in particular uncooked, for example, a young GOUDA of approximately three weeks old, or cheeses which have a rheological profile similar to that of a pressed paste, that is to say, in particular a rheological profile similar to that of a pressed paste in terms of flexibility, cohesion and firmness of the product, as can be measured using a universal compression/traction machine, in particular of the Instrom 4301 type; this type of measurement is illustrated in Example 2;
2) a curd;
3) a cheese product which has a total dry extract of between 40 and 60%, a Ca/ESD (non-fatty dry extract) mineralisation level of less than 2% and in particular a resilient, flexible, non-crumbly paste which has a rheological profile which is substantially similar to that of pressed paste cheeses, in particular obtained by means of coagulation of milk after acidification by means of fermentation and/or addition of acidifying compounds, in order to obtain a pH which is between 5.2 and 5.8, advantageously between 5.2 and 5.5, then adding a coagulating enzyme preparation;
4) concentrates of milk proteins, such as, for example, residues of ultrafiltration, which may be liquid or dried, in so far as they can be retextured;
5) optionally offcuts from cheese cutting;
6) mixing two or more raw cheese materials above, in so far as the mixture can be retextured.

In particular, the curd may be:

a young unripened curd obtained using a conventional curd production method (see, for example, Le Fromage, Eck A. and Gillis J. C., 1997, 3$^{rd}$ Edition, Lavoisier TEC & DOC, Paris, pages 165-374), in particular by means of enzymatic and/or fermentary coagulation of milk, or by means of ultrafiltration of milk followed by acidification of the ultrafiltrate by means of fermentation;

a young unripened curd which is obtained by means of coagulation of milk after acidification by means of fermentation and/or addition of acidifying compounds, such as lactic acid, citric acid, glucono-delta-lactone, in order to obtain a pH of between 5.2 and 5.8, advantageously between 5.2 and 5.5, then adding a coagulating enzymatic preparation in accordance with the method described in the application WO 02/096209;

a "stretched paste" type curd, in particular unripened, (for example, mozzarella).

The cheese bases may be divided or ground, forming pieces, grated matter or semolina-like matter. Advantageously, the initial cheese is grated into strands having a diameter of from 1.5 to 3 mm, for example, using a conventional commercial grater.

Generally, step a) is advantageously carried out by subjecting the initial cheese base to a gentle thermal processing operation, which involves heating to a temperature of between 30 and 80° C., preferably between 30 and 65° C., more preferably between 30 and 60° C., for a period of time of from 20 s to 3 min, preferably for a maximum of 45 s, whilst stirring the cheese paste in order to produce a homogeneous mixture, with moderate shearing, in particular at a stirring speed of less than 1000 rpm, preferably less than 500 rpm.

Temperatures lower than 60° C. advantageously allow the thermal degradation of amine group accepting compounds to be limited when they are present.

The processing operations of step a) are carried out in any appropriate device. These include vapour injection systems, such as "cutters" used in the cooked meats trade or in molten cheese technology and the kneading machines used in bakeries.

The stirring speed is advantageously between 100 and 600 rpm, preferably 100 and 300 rpm, for devices which are conventionally used in the cheese industry. In this manner, the stirring speed is preferably between 100 and 150 rpm for the helical member of a device of the "kneading machine" type and 250 to 300 rpm for the blade of a device of the "cutter" type.

Step b) is advantageously carried out by cooling the paste obtained to a temperature of between 25 and 50° C. for a period of time of from 1 to 5 minutes. The cooling temperature is dependent on the heating temperature but is not greater than 50° C.

The mechanical processing of step b) is the same type as that of step a) although the conditions may vary within the range specified above, steps a) and b) advantageously take place in the same device.

In particular, the steps a) and b) are advantageously carried out with partially reduced pressure in order to prevent flavour losses and to reduce the oxidation of the product; the reduced pressure is advantageously between 0.4 and 0.7 bar (0.4.10$^5$ Pa and 0.7.10$^5$ Pa).

Following step b), the paste obtained may be transferred into an endless screw device where it is subjected to a simple mechanical processing operation which is intended to complete the restructuring of the protein network and to stabilise the emulsion. The length of time spent in the endless screw device is advantageously between 30 seconds and 5 minutes. The term simple mechanical processing operation is intended to refer to a processing operation involving pushing force with no additional effect, such as a heat or pressure effect, as is the case for extrusion. At the output end of the endless screw, a shaping member may optionally be positioned.

It is possible to add, to the initial cheese base, a quantity of water which is calculated in accordance with the dry extract of the initial cheese base, which does not exceed 20% by weight, in particular 15% by weight, and is advantageously greater than 7% by weight. This addition is advantageous in order to obtain a cheese product which has a texture which is flexible, resilient, and which even melts in the mouth.

The products which leave this device are of different shapes (balls, cylindrical shapes, ovoids, etc. . . . ) depending on the profile of the shaping member placed at the output end of the endless screw; they are then chilled and packaged.

The products leaving the endless screw device, at the outlet of the shaping member, may also be placed into moulds in order to confer on the final product the definitive shape desired. Advantageously, it is possible to subject the product placed in the mould to a slight pressing operation in order to improve the shaping.

The final product is then packaged in any appropriate packaging, covered with cheese waxes or substitutes therefor, such as acetoglycerides or edible coatings; it may also be pushed at the outlet of the extruder into plastic shells by passing through a bi-conical packaging device.

Furthermore, the flavouring agents defined above may be incorporated before or during the retexturing method (step a and/or b). Owing to the fact that soluble substances are not eliminated in the method of the invention, these agents remain in the paste, preventing any loss. In this manner, the flavouring agents are preferably added directly into a cutter, or equivalent item of equipment, which is used to process the cheese base.

In a specific embodiment of the above method, the flavouring agent is constituted by a flavour ferment which has an increased level of enzyme activity and weakness of the cell wall.

In another specific embodiment of the above method, step a) and/or b) defined above is carried out in the presence of at least one amine group accepting compound and at least one flavour ferment having an increased level of enzyme activity and weakness of the cell wall and/or flavour ferment lysate, in particular in the presence of at least one amine group accepting compound and at least one flavour ferment lysate, and more specifically in the presence of at least one amine group accepting compound and at least one flavour ferment which has an increased level of enzyme activity and weakness of the cell wall. Tests carried out by the inventors have shown that this embodiment was advantageous for obtaining flavours which are slightly more typical, compared with incorporating only flavour accepting compounds, or only flavour ferments which may or may not be lysed. Furthermore, the inventors have shown that the amine group accepting compounds would accelerate the rate of degradation of the amino acids into flavour molecules and the development kinetics of the flavour ferments.

In a preferred embodiment of the above method, the flavouring agent is added to the cheese base during the step a), after grinding thereof.

In another preferred embodiment of the above method, the flavouring agent is added to the mixture of step a) during step b).

In another preferred embodiment of the above method, at least one strain of lactic bacteria is added to the flavouring agent, in particular a strain of lactic bacteria which is conventionally used in cheese-making, that is to say, a strain of lactic bacteria which does not have an increased level of enzyme activity and weakness of the cell wall thereof, and/or at least one source of peptides or amino acids as flavour precursors. The addition of lactic bacteria which provide in particular enzymes such as transaminases, is particularly advantageous when cheese bases are used for which the coagulation of the curd is obtained by means of a non-biological acidification of milk, that is to say, in particular by adding acidifying compounds, such as lactic acid, citric acid, glucono-delta-lactone, etc. . . . . . The source of peptides and amino acids is advantageous when these compounds, flavour precursors, are present in insufficient quantities, in particular when unripened cheese bases are used; these compounds may be added, for example, in the form of ground cheeses which may be ripened to a greater or lesser extent.

In a particularly preferred embodiment, the invention relates to a method as defined above, in which:
 the cheese base is constituted by a young GOUDA of approximately 3 weeks old or a cheese product which has a total dry extract of between 40 and 60%, a Ca/ESD mineralisation level of less than 2% and in particular a flexible, resilient, non-crumbly paste which has a rheological profile which is substantially similar to that of pressed paste chesses, the cheese base being obtained in particular in accordance with the method described in the international application WO 02/096209, that is to say, in particular by means of coagulation of milk after acidification by means of fermentation and/or addition of acidifying compounds, such as lactic acid, citric acid, glucono-delta-lactone, in order to obtain a pH of between 5.2 and 5.8, advantageously between 5.2 and 5.5, then adding a coagulating enzyme preparation, such as rennin;
 the cheese base is divided in the form of strands, grated matter or semolina-like matter;
 water is optionally added in a quantity not greater than 20% by weight of the dry extract of the initial cheese base,
 the above admixture is thermally and mechanically processed, with a kneading type processing operation, at a temperature of a maximum of 60° C., preferably from 30 to 60° C. for a period of time of from 20 s to 3 minutes, with the paste being stirred at a rate of between 200 and 2000 rpm, with a shearing speed of between 10 and 200 $s^{-1}$;
 the processed admixture is chilled to a temperature of between 8 and 20° C.;
 optionally, the product obtained is shaped and packaged; and in which there is mixed and added to the divided cheese base and/or the processed admixture: a flavour ferment which is obtained from the strain L. helveticus BS121 which has an increased level of enzyme activity and weakness of the cell wall thereof, at an injection level of from 0.5 to 3% with respect to the mass of the initial cheese base, which corresponds to approximately $10^7$-$10^8$ cells per gramme of initial cheese base, α-ketoglutarate at a content of 10 g/kg of cheese base and a source of peptides and amino acids constituted by ground Gouda of approximately 2 to 6 months old at a content of from 0.5 to 10%, preferably from 1 to 5% relative to the mass of initial cheese base.

The cheese product obtained using this specific embodiment has a flexible, resilient texture and has the analytical and organoleptic properties of ripened cheeses of the GOUDA type.

The injection level of the flavour ferment obtained from the strain L. helveticus BS121 according to the invention corresponds to a measure which is equivalent to the measure which is used in conventional cheese making technology.

The thermal and mechanical processing step is carried out in any appropriate device, such as vapour injection systems which are used in the cooked meats trade or in molten cheese technology, or kneading machines for bakeries.

After 8 to 15 days at a ripening temperature of from 12-14° C., the product obtained is more typical and resembles a pressed paste of the GOUDA type which has been ripened for from 2 to 3 months.

The product was judged by means of sensory analysis in comparison with a GOUDA reference from a conventional technique with a conventional flavour ferment being incorporated (that is, approximately 0.10% in concentrated form using an appropriate means, in particular centrifuging-equivalent to approximately from 2 to 2.5% without concentration). The addition of only flavour ferment according to the invention leads to a flavour development with characteristics which are different from those of the reference; furthermore, the addition of α-ketoglutarate brings about a more pronounced "diacetyl" note and more rapid flavour compound production kinetics (see Example 1).

This product has advantageous organoleptic characteristics and is produced using a simple, economical method which can be more readily reproduced and which allows soluble flavour precursors to be used without any loss in the lactosérum during the method in contrast to their use in conventional cheese-making.

Preferably, the cheese product obtained in accordance with the method of the invention is ripened for from 1 to 4 weeks at a temperature of from 8° C. to 16° C.

The present invention also relates to a cheese product which is capable of being obtained using a method as defined above.

The present invention also relates to the use of a cheese product as defined above, prepared from a cheese which may or may not be ripened, in order to reinforce the flavour of culinary preparations or molten cheeses.

In particular, in order to rapidly produce a cheese product for reinforcing the flavour of culinary preparations or molten cheeses, it is possible to allow it to ripen at temperatures which accelerate the development of flavours (from 16 to 30° C.).

The invention will be further defined with reference to the examples below given by way of non-limiting example.

EXAMPLES

Example 1

Preparation of a Cheese Product

The objective of this example is to study the impact of the addition of flavour ferments of the type Lactobacillus helveticus (source of proteases, peptidases and transaminases) which have an increased level of peptidase enzyme activity and weakness of the cell wall and/or α-ketoglutarate (α-KG) on the flavour development and the catabolism of the amino acids, in the presence of a source of peptides and amino acids (ground cheddar).

1. Preparation of the Solution of α-KG
 α-KG (Biosaveurs, Montpellier, France) is diluted in water at a concentration of 40 mg per 100 ml of water. The pH of the solution is then adjusted to the pH of the raw material used, that is, in this instance pH=5.5 with 10N sodium carbonate (400 g/l).

2. Preparation of the Strain of *Lactobacillus helveticus*

The strain of *Lactobacillus* used was prepared by means of culture of a strain of *Lactobacillus helveticus* BS121 (Registration number CNCM, 1-3552) over a medium which is based on milk powder and which is deficient in terms of nitrogen (compared with the nitrogen content of a standard medium having an identical composition), in the presence of a growth activator (meat extract).

At the end of the culture, the total aminopeptidase activity is twice that of a conventional culture and a percentage of cells is reached whose cell wall is weakened by approximately 90% compared with approximately 10% in conventional culture.

3. Formulation

The cheese base selected is unripened young Gouda of approximately 3 weeks old (cheese of the uncooked pressed paste type).

100% of this cheese base is divided, representing 90% of the formula, and it is mixed with:

5% of water

5% of Cheddar of approximately 5 to 6 months old, (source of peptides and amino acids);

optionally a strain of *L. helveticus* BS121 at approximately $10^7$ CFU/g prepared as indicated above and/or optionally 10 g/kg of α-KG.

4. Preparation (Cutting/Baking)

The cheese product is then prepared as indicated above based on the mixture above at a temperature of 55° C., at a pressure of 1 bar, with stirring at 500 rpm for 40 seconds. After processing, the product obtained is chilled to 14° C. and then left to ripen at this temperature.

5. Sensory Analysis Panel

The cheese product obtained above is then subjected to a sensory analysis panel comprising 10 experts who characterise its flavour. In brief, the cheese products are prepared as indicated above without any flavour ferment and α-KG (E1), with only flavour ferment (E2), or with flavour ferment and α-KG (E3) after a ripening period of 2, 4 or 8 weeks (S+2, S+4 or S+8, respectively). The results of this analysis are set out in the table below.

| EXPERIMENT | REFINEMENT | TASTE |
| --- | --- | --- |
| E1 (reference) | S + 2 | Soft, slightly acidic, insipid, bland |
|  | S + 4 | Insipid, neutral |
|  | S + 8 | Insipid, neutral, no defect |
| E2 (*L. helveticus* BS121 used alone) | S + 2 | Slight acidity, sour, fresh, acidic |
|  | S + 4 | More fruity flavour, more flavoursome, more "cheese-like", slight characteristic of "washed rind cheese" |
|  | S + 8 | Fruity, flavoursome, smoky, baked pressed paste cheese, slightly acidic |
| E3 (*L. helveticus* BS121 + α-KG) | S + 2 | Slight acidity, "ripened" note already perceptible |
|  | S + 4 | Slightly acidic, "ripened", quite typical |
|  | S + 8 | Marked "ripened" note, quite close to E2 but slightly more typical, slightly acidic, smoked, flavoursome |

In conclusion, the flavour ferment used alone or in association with α-KG leads to a flavour development which is significantly greater than that of the reference, with flavours such as "fruity", uncooked pressed paste, and "smoked", from as early as the fourth week.

At the same time, it was verified that the secondary proteolysis (release of small peptides and amino acids) was greatly accelerated in the presence of this flavour ferment and that the flavour compounds on which the development of the flavour is based did indeed originate from the degradation of the amino acids, essentially by means of transamination.

Example 2

Measurement of the Rheological Characteristics of a Pressed Paste Cheese

Samples of cheeses were removed from the piece carrier for rheological analysis (cylinder of 17 mm diameter and 20 mm height). The analyses were carried out in a universal compression/traction machine Instron 4301. The measurements were carried out between a fixed lower plate and a movable sensor, both of which have a planar geometry and are covered with lubricating paper of the Parafilm type. The cylindrical axial sensor with a vertical axis has a diameter of 59 mm.

The test applied is a "TPA" test (Texture Profile Analysis). It is characterised by two identical cycles of uni-axial compression with a rest time between them. The compression rate applied to the cheese sample is 75% at a rate of 50 mm/min. The force (stress) is measured in accordance with the movement of the sensor. Various characteristic points are derived from the lines obtained: the force at 50% deformation, the breaking force and the force at 75% compression, the deformation at break, the initial slope and, finally, the different parameters originating from data analysis obtained using an item of software; these are cohesion (ratio of the two positive areas) and elasticity (ratio of the heights of the two apexes).

For each cheese analysed, three measurements are carried out based on three different samples. The parameters analysed are therefore the mean of three tests.

Biochemical characteristics of a pressed paste cheese matured for three weeks:

| | |
| --- | --- |
| Total dry extract (EST, g/100 g) | 54.5 |
| Fatty materials (MG, g/100 g) | 28.3 |
| pH | 5.2 |

Rheological characteristics of the same cheese:

| | |
|---|---|
| Force at break = maximum force (N) | 24 ± 4.4 |
| Deformation at break (%) | ≥75% ± 0 (18 s) |
| Gradient at origin | 0.07 ± 0.01 |

Example 3

Metering Protocol for Aminopeptidase Activity

1. Preparation of the metering solutions
   A phospate buffer solution is prepared by mixing:
   a volume of 0.1 M monopotassic phosphate solution $KH_2PO_4$ (13.6 g/l);
   two volumes of 0.1 M disodic phosphate solution $Na_2HPO_4,2H_2O$ (17.8 g/l).
   A substrate solution is also prepared by mixing 6.03 mg of L-leucine-p-nitroanilide (L9125 Sigma) in 1 ml of methanol in order to obtain a solution at 24 mM.
2. Metering
   The following mixtures are produced:

| | Solution to be metered (μl) | Substrate (μl) | Phosphate buffer (ml) |
|---|---|---|---|
| Reference buffer | 0 | 0 | 3 |
| Reference substrate | 0 | 200 | 2.8 |
| Reference solution to be metered | 100 | 0 | 2.9 |
| Solution to be metered (containing a flavour ferment) | 100 | 200 | 2.7 |

The mixtures are left to incubate at 30° C. for 1 hour, then the absorbency is read at 410 nm.

The invention claimed is:

1. A method for flavoring a cheese product by processing at least one initial cheese base, said initial cheese base being a cheese which can be retextured, and which may or may not be ripened, said method involving the following steps:
   a) thermally and mechanically treating the initial cheese base by a kneading processing operation, at a temperature $T_1$ of between 30° C. and 60° C. for a period of time of from 20 s to 3 mins in order to obtain a mixture having limited destructuring of the protein network of the initial cheese base;
   b) cooling the mixture of step a) to a temperature $T_2$ of between 25 and 50° C. for a period of time of from 1 to 5 min, in order to restructure the protein network and produce a stable emulsion to obtain a cheese product;
   c) optionally mechanically processing the cooled mixture of step b) in an endless screw device in order to complete the restructuring of the protein network and the stabilisation of the emulsion to obtain a cheese product; and
   d) optionally shaping the cheese product obtained after step c) or after step b) if step c) is omitted;
   wherein at least one flavoring agent is a flavor ferment which has an increased level of enzyme activity and weakness of the cell wall, said at least one flavor agent is obtained by culturing under sub-optimal conditions in a medium which is deficient in nitrogen, wherein the flavor ferment which has an increased level of enzyme activity and weakness of the cell wall is selected from the group consisting of homofermentary or heterofermentary strains of thermophilic *Lactobacilli*, optional homofermentary or heterofermentary mesophilic strains of *Lactobacilli*, strains of *Lactococci*, strains of *Pediococci*, strains of *Corynebacteria*, strains of propionic bacteria, strains of yeasts and *Geotrichum candidum*, and said at least one flavoring agent is incorporated before or during step a) and/or b).

2. The method according to claim 1, wherein step a) and/or b) is carried out in the presence of at least one amine group accepting compound and at least one flavor ferment which has an increased level of enzyme activity and weakness of the cell wall.

3. The method according to claim 1, wherein the flavoring agent is added to the cheese base during step a) after being ground.

4. The method according to claim 1, wherein the flavoring agent is added to the mixture of step a) during step b).

5. The method according to claim 1, wherein the flavor ferment which has an increased level of enzyme activity and weakness of the cell wall is obtained from the strain *Lactobacillus helveticus* BS121, registered in accordance with the Treaty of Budapest, 12 Jan. 2006, with the National Collection of Micro Organism Culture (CNCM, Paris, France) under the number I-3552.

6. The method according to claim 1, wherein the levels of injection with flavor ferment are from $10^5$ to $10^8$ cells of ferment/g of cheese base.

7. The method according to claim 2, wherein the amine group accepting compound is α-ketoacid.

8. The method according to claim 2, wherein the amine group accepting compound is α-ketoglutarate.

9. The method according to claim 2, wherein the amine group accepting compound is added at a content of from 1 to 20 g/kg of cheese base.

10. The method according to claim 1, wherein at least one strain of lactic bacteria, and/or at least one source of peptides and amino acids, is/are added to the flavoring agent.

11. The method according to claim 1, wherein:
    the cheese base is selected from the group consisting of a young GOUDA of 3 weeks old and a cheese product which has a total dry extract of between 40 and 60%, a Ca/ESD mineralisation level of less than 2% obtained by way of coagulation of milk after acidification by way of fermentation and/or addition of acidifying compounds in order to obtain a pH of between 5.2 and 5.8, then adding a coagulating enzyme preparation;
    the cheese base is divided in the form of strands, grated matter or semolina-like matter;
    the above admixture is thermally and mechanically processed, with a kneading type processing operation, at a temperature of a maximum of 60° C. with the paste being stirred at a rate of between 200 and 2000 rpm, with a shearing speed of between 10 and 200 $s^{-1}$;
    the processed admixture is chilled to a temperature of between 8 and 20° C. to obtain the cheese product;
    optionally, the product obtained is shaped and packaged; and
    wherein there is added and mixed to the divided cheese base and/or the processed admixture: a flavor ferment which is obtained from the strain *L. helveticus* BS121 (registered with CNCM under the number I-3552) which has an increased level of enzyme activity and weakness of the cell wall thereof, said flavor ferment is obtained by culturing under sub-optimal conditions in a medium which is deficient in nitrogen, at an injection level of from 0.5 to 3% with respect to the mass of initial cheese base, α-ketoglutarate at a content of 10 g/kg of cheese base and a source of peptides and amino acids constituted by ground Gouda which is matured for approximately from 2 to 6 months at a content of from 0.5 to 10%, relative to the mass of initial cheese base.

12. The method according to claim 1, wherein the cheese product obtained is ripened for from 1 to 4 weeks at a temperature of from 8° C. to 16° C.

13. The method according to claim 11, wherein the source of peptides and amino acids constituted by ground Gouda which is matured for approximately from 2 to 6 months is added at a content of from 1 to 5% relative to the mass of initial cheese base.

14. A method for flavoring with a fruity, non-baked pressed paste and smoked flavor a cheese product by processing at least one initial cheese base, said initial cheese base being a cheese which can be retextured, and which may or may not be ripened, said method involving the following steps:
   a) thermally and mechanically treating the initial cheese base by a kneading processing operation, at a temperature $T_1$ of between 30 and 60° C. for a period of time of from 20 s to 3 min, in order to obtain a mixture having limited destructuring of the protein network of the initial cheese base;
   b) cooling the mixture of step a) to a temperature $T_2$ of between 25 and 50° C. for a period of time of from 1 to 5 min, in order to restructure the protein network and produce a stable emulsion to obtain a cheese product;
   c) optionally mechanically processing the cooled mixture of step b) in an endless screw device in order to complete the restructuring of the protein network and the stabilisation of the emulsion to obtain a cheese product; and
   d) optionally shaping the cheese product obtained after step c) or after step b) if step c) is omitted;
   wherein at least one flavoring agent, which is a flavor ferment which has an increased level of enzyme activity and weakness of the cell wall and which is obtained from the strain *Lactobacillus helveticus* BS121, registered in accordance with the Treaty of Budapest, 12 Jan. 2006, with the National Collection of Micro Organism Culture (CNCM, Paris, France) under the number I-3552, said at least one flavor agent is obtained by culturing under sub-optimal conditions in a medium which is deficient in nitrogen, and said at least one flavoring agent is incorporated before or during step a) and/or b).

15. A method for flavoring a cheese product by processing at least one initial cheese base, said initial cheese base being a cheese which can be retextured, and which may or may not be ripened, said method involving the following steps:
   a) thermally and mechanically treating the initial cheese base by a kneading processing operation, at a temperature 1 of between 30 and 60° C. for a period of time of from 20 s to 3 min, in order to obtain a mixture having limited destructuring of the protein network of the initial cheese base;
   b) cooling the mixture of step a) to a temperature $T_2$ of between 25 and 50° C. for a period of time of from 1 to 5 min, in order to restructure the protein network and produce a stable emulsion to obtain a cheese product;
   c) optionally mechanically processing the cooled mixture of step b) in an endless screw device in order to complete the restructuring of the protein network and the stabilisation of the emulsion to obtain a cheese product; and
   d) optionally shaping the cheese product obtained after step c) or after step b) if step c) is omitted;
   wherein at least one flavoring agent which is a flavor ferment which has an increased level of enzyme activity and weakness of the cell wall, said at least one flavor agent is obtained by culturing under sub-optimal conditions in a medium which is deficient in nitrogen, wherein the flavor ferment which has an increased level of enzyme activity and weakness of the cell wall is selected from the group consisting of homofermentary or heterofermentary strains of thermophilic *Lactobacilli*, optional homofermentary or heterofermentary mesophilic strains of *Lactobacilli*, strains of *Lactococci*, strains of *Pediococci*, strains of *Corynebacteria*, strains of propionic bacteria, strains of yeasts and *Geotrichum candidum*, and said at least one flavoring agent is incorporated before or during step a) and/or b), and
   wherein step a) and/or b) is carried out in the presence of at least one amine group accepting compound and at least one flavor ferment which has an increased level of enzyme activity and weakness of the cell wall.

* * * * *

UNITED STATES PATENT AND TRADEMARK OFFICE
CERTIFICATE OF CORRECTION

PATENT NO. : 8,722,118 B2 Page 1 of 1
APPLICATION NO. : 12/298479
DATED : May 13, 2014
INVENTOR(S) : Gilbert Delespaul It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 797 days.

Signed and Sealed this
Twenty-ninth Day of September, 2015

Michelle K. Lee
*Director of the United States Patent and Trademark Office*